(No Model.)

N. H. DAVIS.
CAR SPRING.

No. 390,069.  Patented Sept. 25, 1888.

WITNESSES:
Jas. F. Kelly.
L. Douville

INVENTOR:
Nathan H. Davis
BY Diederich & Kintner
ATTORNEY.

UNITED STATES PATENT OFFICE.

NATHAN H. DAVIS, OF PHILADELPHIA, PENNSYLVANIA.

CAR-SPRING.

SPECIFICATION forming part of Letters Patent No. 390,069, dated September 25, 1888.

Application filed July 9, 1887. Serial No. 243,836. (No model.)

*To all whom it may concern:*

Be it known that I, NATHAN H. DAVIS, a citizen of the United States, residing in the city and county of Philadelphia, State of Pennsylvania, have invented a new and useful Improvement in Car-Springs, which improvement is fully set forth in the following specification and accompanying drawings.

My invention relates to improvements in car-springs; and it consists of a spring-plate formed with depressions of the form of segments of spheres, which strengthen the plate and prevent lateral displacement of the springs.

It also consists of a spring-plate strengthened by crimping, as will be hereinafter set forth.

Figure 1:
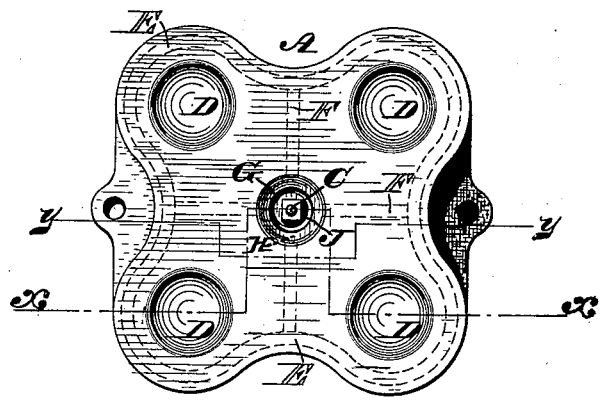
Figure 2:
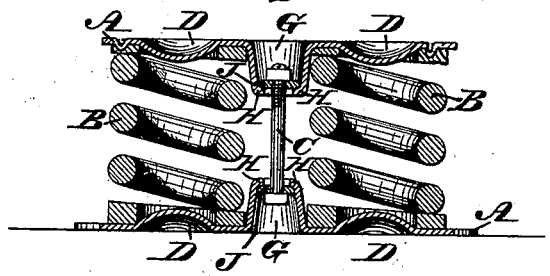
Figure 3:

Figure 1 represents a top or plan view of a car-spring embodying my invention. Fig. 2 represents an irregular vertical section thereof in line $x\ x$, Fig. 1, the crimp being shown in dotted lines. Fig. 3 represents a section of a portion thereof in line $v\ v$, Fig. 1.

Similar letters of reference indicate corresponding parts in the several figures.

Referring to the drawings, A represents upper and lower spring plates. B represents the springs, which are interposed between the said plates; and C, the connecting bolt, which features, broadly considered, are well known. In the spring-plates are concave depressions D, the inner faces of which enter the ends of the springs B, whereby lateral displacement of the latter is prevented. The spring-plates are crimped, forming corrugations near the peripheries or outer rims, as at E, and centrally in cross directions, as at F F, the crimps E strengthening or stiffening the outer rims of the plates and the crimps F F strengthening or stiffening the main portions of the bodies of said plates.

I am aware that it is not new to pierce spring-plates to form openings therein and flange the walls thereof. I am also aware that it is not new to form spring plates with cylindrical depressions; but in my case the metal is not pierced, but left intact, and has its depressions of gradually-increasing depth with curved surfaces or of the form of segments of spheres, whereby the thin and broken metal at the angle of cylindrical-shaped depressions is obviated, and I produce stronger and more durable spring-plates.

Each of the sockets G, which receive the head and nut of the bolt C, is integral with the respective spring-plate, and as the same requires to be sufficiently long, so that the end of the bolt does not project outside of the spring when the latter is loaded, said sockets are made of width considerably greater than the thickness of the bolt, and their inner ends are bent, forming flanges H. Washers J are placed in the sockets and rest against said flanges H, and have openings to receive the bolt, it being noticed that the nut and head of the bolt are in contact with said washers J and controlled by the same, whereby separation of the plates and dismemberment of the springs are prevented.

Having thus described my invention, what I claim as new, and desire to secure by Letters Patent, is—

1. The spring-plate of a car-spring, having a depression of the form of the segment of a sphere, substantially as described.

2. A spring-plate with a crimp near the rim thereof, substantially as described.

3. A spring-plate with a crimp in the body thereof, substantially as described.

4. A spring-plate with cross-crimps in the body thereof, substantially as described.

5. A spring-plate having crimps in the same at or near the rim and center thereof, substantially as described.

6. Spring-plates having sockets with flanged ends and washers occupying said sockets resting against the flanged ends thereof, said washers having openings for the connecting-bolt of the spring-plates, said parts being combined and operating substantially as described.

7. A car spring having a spring-plate with a series of depressions, as D, each of the form of the segment of a sphere, said depressions being on opposite sides of a central socket of said plate, substantially as described.

NATHAN H. DAVIS.

Witnesses:
JOHN A. WIEDERSHEIM,
A. P. JENNINGS.